United States Patent [19]

Anderson et al.

[11] Patent Number: 4,544,968
[45] Date of Patent: Oct. 1, 1985

[54] SECTOR SERVO SEEK CONTROL

[75] Inventors: Todd B. Anderson; Thomas W. Glaser; John J. Neesz, all of Rochester, Minn.

[73] Assignee: International Business Machines Corporation, Armonk, N.Y.

[21] Appl. No.: 378,966

[22] Filed: May 17, 1982

[51] Int. Cl.⁴ .............................................. G11B 5/55
[52] U.S. Cl. ................................................. 360/78
[58] Field of Search ..................................... 360/78

[56] References Cited

U.S. PATENT DOCUMENTS

| 4,031,443 | 6/1977 | Droux et al. | 318/561 |
| 4,257,074 | 3/1981 | Goss | 360/78 |
| 4,297,734 | 10/1981 | Laishley et al. | 360/78 |
| 4,352,131 | 9/1982 | Van Herk et al. | 360/78 |
| 4,355,273 | 10/1982 | DuVall | 318/561 |
| 4,381,526 | 4/1983 | McLaughlin et al. | 360/78 |

FOREIGN PATENT DOCUMENTS

WO83/04133 11/1983 PCT Int'l Appl. .............. 360/78

OTHER PUBLICATIONS

IBM Technical Disclosure Bulletin, vol. 22, No. 11, Apr. 1980, Fast Eigenvector Control of a Disk File Actuator, pp. 5069–5075, R. S. Palmer.

Primary Examiner—George G. Stellar
Attorney, Agent, or Firm—Robert W. Lahtinen

[57] ABSTRACT

A sector servo seek control samples each sector to obtain sector time, the track identification within a sequence of track types and a position error signal for a track location to track location seek. The device during each sector determines the actual transducer track location and the next sector projected track location with respect to the sequence of track types. The projected track location is corrected using the error signal to find the actual location, but if a sector signal is missing or erroneous, the projected location is used as the actual location, permitting a composite correction to be made when a correct sector signal is obtained. The seek time is minimized by using maximum acceleration followed by maximum deceleration while not exceeding a velocity value that would cause the device to overshoot the target track using full deceleration.

5 Claims, 9 Drawing Figures

SECTOR SERVO SEEK CONTROL

BACKGROUND OF THE INVENTION

This invention relates to data storage devices using sector servo wherein data and servo information appear in parallel tracks composed of sectors and more particularly to a seek control system for moving the transducer assembly from one track location to another track location.

The invention utilizes a servo system that possesses a wide capture area and particularly a wide linear capture area. Such a system having a 4 track capture area with a three track linear region is shown and described in U.S. Pat. No. 4,400,747 and briefly described herein. In a sector servo system servo information appears briefly once per sector separated by much longer data sector protions. Thus, in contrast to dedicated servo systems wherein servo data is almost continuous, a sector servo system has servo information available on a relatively infrequent basis and must also be tolerant of missing sectors when servo information is missed or not accurately read in whole or in part.

SUMMARY OF THE INVENTION

In a sector servo system where servo information is infrequent as compared to a dedicated servo with substantially continuous information, effective control is more difficult and may be aggravated by missing sector information. In the system described sector information is used to determine a projected location and convert that position to an actual position during each sector time. Since sector sampling occurs frequently (for example more than 3,000 times per second) the change from sector to sector is small and the system is tolerant of missing sector information since several sectors in sequence could be missed, during which the projected position is used as actual, and the correct actual position determined at the next correctly identified sector time without a deviation that would threaten the accuracy of the system.

To optimize the effectiveness of the seek operation, the minimum time interval should be used to complete the seek of the transducer from one track location to another track location. To obtain the shortest access time, it is ideal to use the maximum acceleration followed by the maximum deceleration. In the system shown the transducer assembly is given maximum acceleration by applying forward direction drive during each successive sector time until a desired velocity is attained. For any location of tracks remaining during the seek, there is a velocity value above which the transducer cannot be stopped at the target track without overshooting. The line representing the value of this velocity for the various number of remaining tracks must not be exceeded if the seek is to be successfully completed without overshooting the target track. The sequence of desired velocity values is closely adjacent the maximum velocity curve with velocity values sufficiently lower to permit effective control without exceeding the maximum velocity line at any point in the seek. In addition a dead band is provided in a narrow velocity range for which the sequence of desired velocity values is the upper limit. When the velocity is below the dead band a sector of forward drive is applied, when the velocity is above the dead sector of reverse direction drive is applied and when the sampled velocity is within the dead band, no drive is applied, and the transducer assembly is allowed to coast for a sector time. Use of a dead band during deceleration reduces the need for sectors of foward drive and permits controlled deceleration using almost totally reverse direction drive interspersed with no drive sectors when the transducer coasts.

BRIEF DESCRIPTION OF THE DRAWINGS

The details of the invention will be described in conjunction with the accompanying drawings in which.

DETAILED DESCRIPTION

Figure 1:
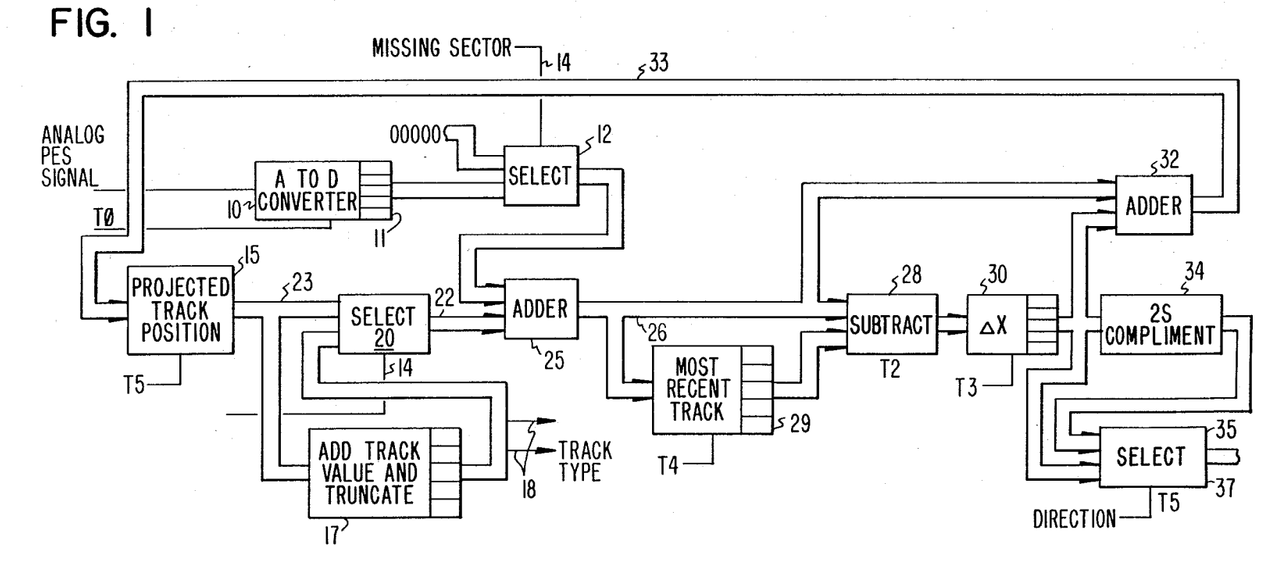
FIG. 1 is a block diagram showing the projection of next sector time position and correction to achieve the actual present location using the position error signal.

Referring to FIG. 1, an analog position error signal is communicated to the analog to digital converter 10 where at time T0 the value is latched in a five bit register 11. The output register 11 of A/D converter 10 is received as an input of the select circuit 12 and normally becomes the circuit output. If however a signal appears on missing sector line 14, indicating that a sector has been missed, the output of selection circuit becomes 5 zero bits to prevent an error correction.

During the previous cycle the last sector projected position was latched in register 15 at T5 time. The last sector projected position is truncated and rounded to a whole number indicative of the track type by circuit 17 and latched in the output register. The two lines 18 from the output make the track type available to the system. Select circuit 20 normally selects the rounded-off track type output of circuit 17 as the output on bus 22; however, when missing sector line 14 is active indicating the absence of a sector signal, the select circuit selects the last sector projected position from bus 23. The output of selection circuits 12 and 20 are totaled by adder 25 at T1 time to produce the actual position signal in bus 26 which is normally the rounded off projected position plus the error signal value to provide the correct current position as a five bit output wherein the most significant two bits indicate the track type and the remaining 3 bits show the deviation in one-eighth track increments. When a missing sector is indicated, the adder output on bus 26 is the unmodified last sector projected position from the latched output of register 15.

At T2 time the difference circuit 28 subtracts the actual position of the last cycle stored in register 29 from the current actual position on bus 26. At T3 time the delta X value representative of the velocity during the sector is latched in register 30. Adder 32 at T4 time adds the actual position and the velocity (which for a sector is the distance traveled during a sector time) to yield the projected location on bus 33. Also at T4 time 2's compliment circuit 34 yields a negative input to selector 35. At T5 time the direction signal selects the absolute velocity value for output on bus 37, and the value on bus 33 is loaded into the output register of circuit 15.

Figure 2:
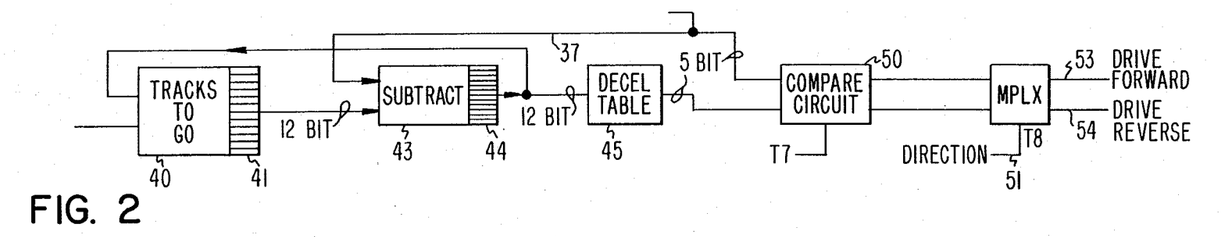
FIG. 2 is a block diagram showing the recording of remaining tracks during the seek operation and drive control.

In FIG. 2, the number of tracks to be traversed is loaded by the circuit 40 into the 12 bit output register 41. During each sector cycle during the seek, the distance value or delta X value on bus 37 is subtracted from the current value in register 41 by circuit 43 and the remainder latched into register 44 at T6 time such that register 41 contains the current value of the tracks remaining during the seek. The output of register 44 also accesses the deceleration table 45 which reflects the values of the deceleration curve 47 of FIG. 3 to produce a desired velocity per sector on bus 48. At T7 time compare circuit 50 determines whether the actual velocity or desired velocity is greater and with the direction signal on line 51 outputs signals on lines 53 and 54 at T8 times to indicate forward drive or reverse drive. If both forward and reverse drive lines are at the same level, the actuator carriage is allowed to coast for one sector. The times indicated throughout FIGS. 1 and 2, T0 through T8 are consecutive.

Figure 3:
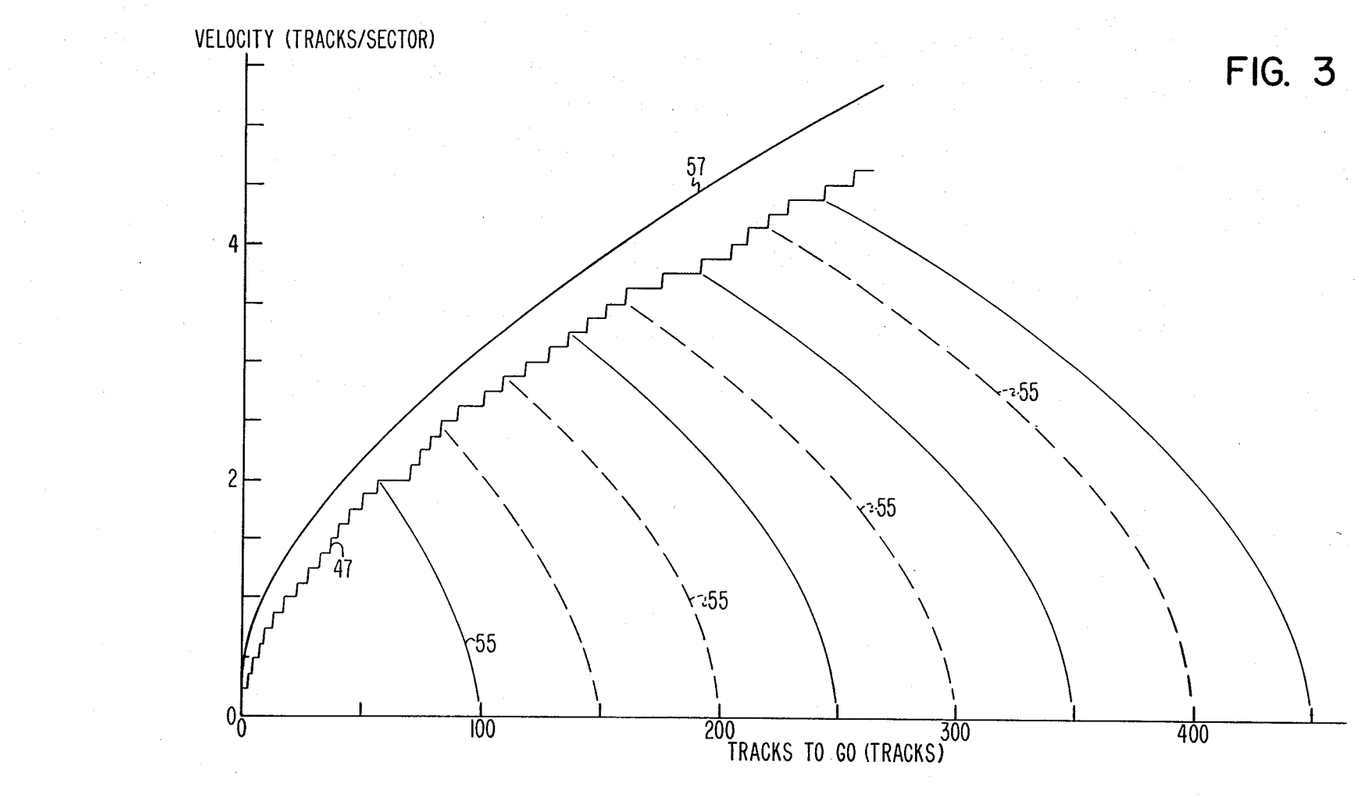
FIG. 3 is a graphic representation of acceleration and deceleration values.

FIG. 3 shows the curves that are indicative of the acceleration and deceleration values attained during a multi-track seek by the transducer head supporting carriage. The "tracks to go" on the X axis show the number of tracks to be traversed during the seek. The family of curves 55 extending from the X axis show maximum acceleration curves from selected lengths of a track seek representative of an acceleration generated by applying forward drive during each sector time until a desired velocity is approached. As long as the seek sequence is following an acceleration curve until within ⅛ track per sector velocity of the established velocity deceleration curve 47, full forward drive power is supplied during each successive sector. When on curve 47 or within ⅛ track per sector below curve 47, no drive power is applied and when the velocity exceeds curve 47 full deceleration power is applied during the next sector. The maximum deceleration curve 57 is the velocity value that must not be exceeded if an overshot of the target track is to be avoided.

During each sector time of the multi-track seek the following events occur. The last sector actual position has the velocity per sector added thereto to establish a next sector projected position to which a ⅜ track value is added and the total truncated to a rounded-off whole number track type. The track value is a 5 bit digital number wherein the two most significant digits indicate one of the four track types and the 3 least significant digits are the digital deviation from the track centerline in eighths of a track; thus 01011 represents track type 1 displaced ⅜ track toward the adjoining track type 2. The position error signal is then added to the whole number track type above with the sum indicative of the actual position of the transducer head within the 4 track bracket. Since the maximum acceleration during a sector is about 0.05 tracks per sector, it is unlikely that the calculated position will fall outside the 4 track type group of tracks either through error or as a result of several sequentially missing sector signals. When a missing sector signal is received, the projected sector position modifying circuits are disabled, and the projected sector position is gated instead during the sector. Further the position error signal is disabled and a zero correction gated. Accordingly, the projected position is used and modified by the last accurate velocity value during each sector where a missing sector signal is indicated. By following this procedure the transducer position is determined, and the "tracks to go" register count is updated approximately 4,000 times per second.

The technique may be practiced using hardware logic circuits when high speed is required or in conjunction with a controller or processor when slower speed execution of the steps can be tolerated. The flow chart of FIG. 4 also illustrates the sequence of data handling which occurs during each sector time of a seek operation after initialization. Upon entering the sequence (FIG. 4A) the occurrence of a missing sector is determined. If no sector identifying signal is received during a predetermined time, it is determined that a sector has been missed, and the unmodified projected sector position is used and not corrected pending receipt of an accurate sector signal during a subsequent sector time when the then sensed error signal will make a composite correction for deviations occurring during the plurality of sectors since the last correct sector time.

Figure 4A:
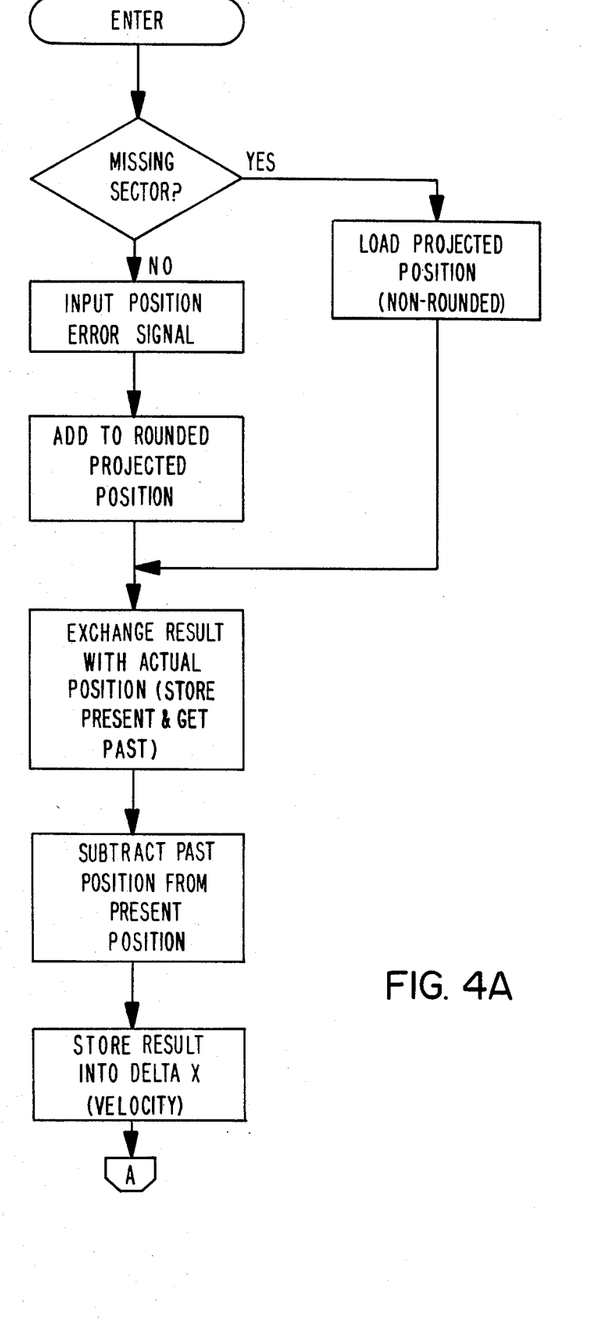
FIGS. 4A through 4E comprise a flow chart showing the steps of the seek control technique.
Figure 4B:
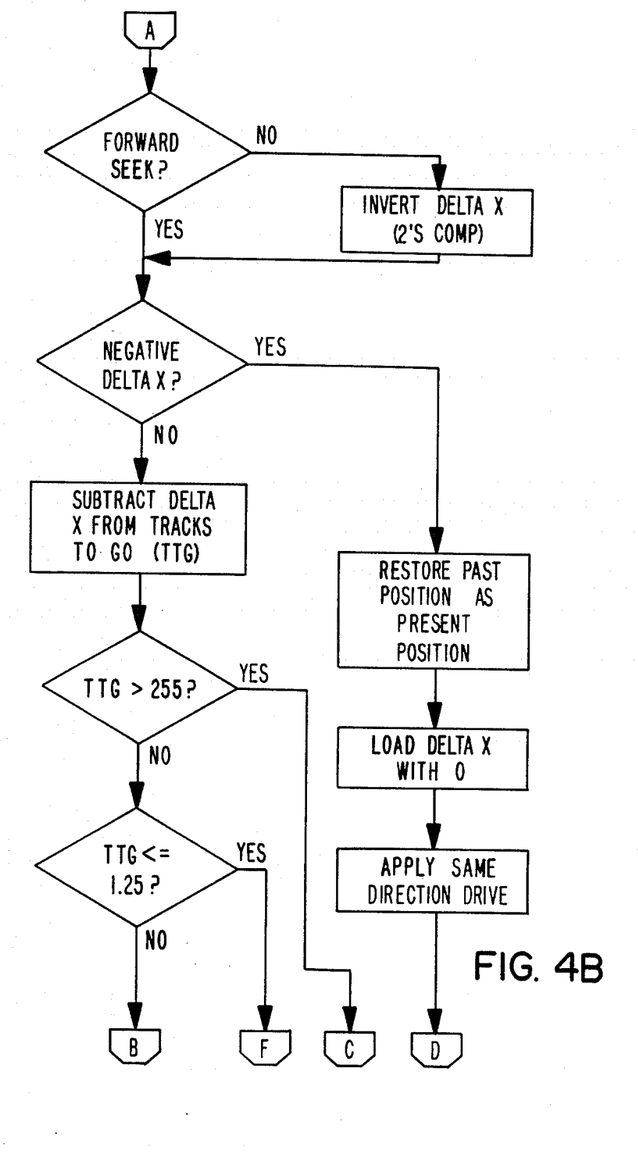

If the sector signal is correctly sensed, the normal procedure follows wherein the sensed position error signal (PES) is gated and added to the rounded projected position. When the actual position is determined by adding the error signal to the rounded projected position, the position from the previous sector is subtracted from the present actual position to give a delta X or velocity value. Since delta X is the velocity per sector for a one sector period, the value also is the distance in tracks that the transducer assembly moved since the last sector time or sector signal sample time.

If a forward seek (FIG. 4B) is occurring in the direction of ascending track type numbers, no action is required. If the seek is in the opposite direction, delta X is inverted using 2's compliment arithmetic. If delta X is sensed to be a negative value, it is regarded as an error condition and the system ignores the value causing the past position to be restored as the present position. The delta X is loaded with a zero value, and the same direction drive is applied. If no error condition is identified by a negative delta X value, the delta X value is subtracted from the "tracks to go" (TTG) register.

Figure 4C:
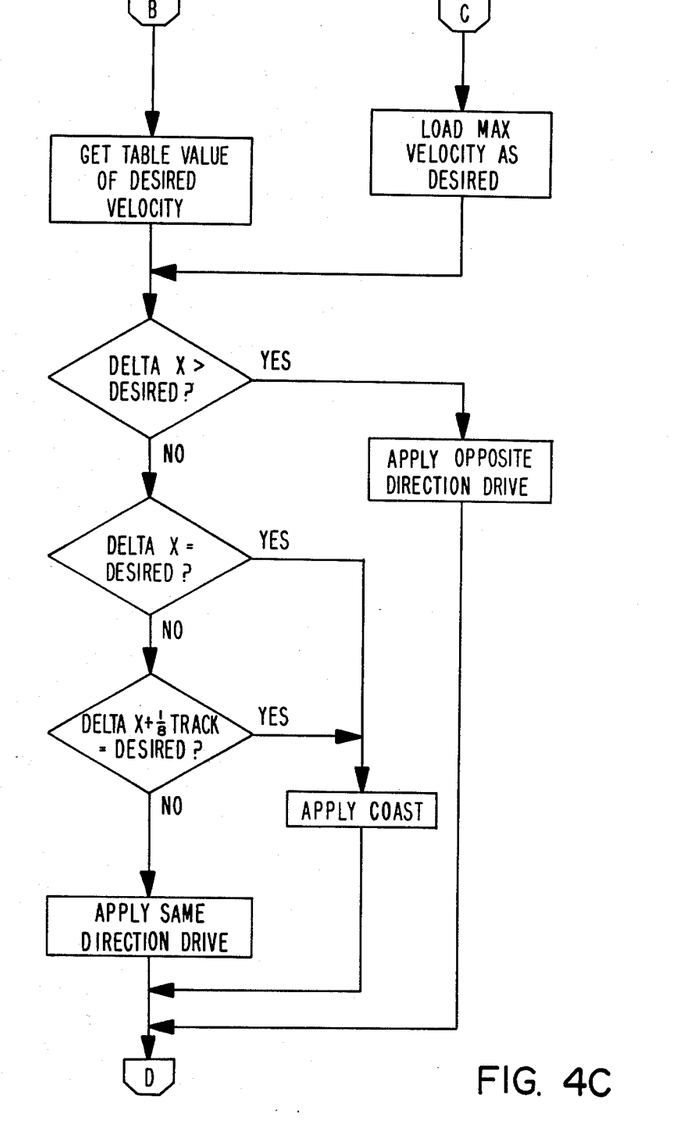
Figure 4D:
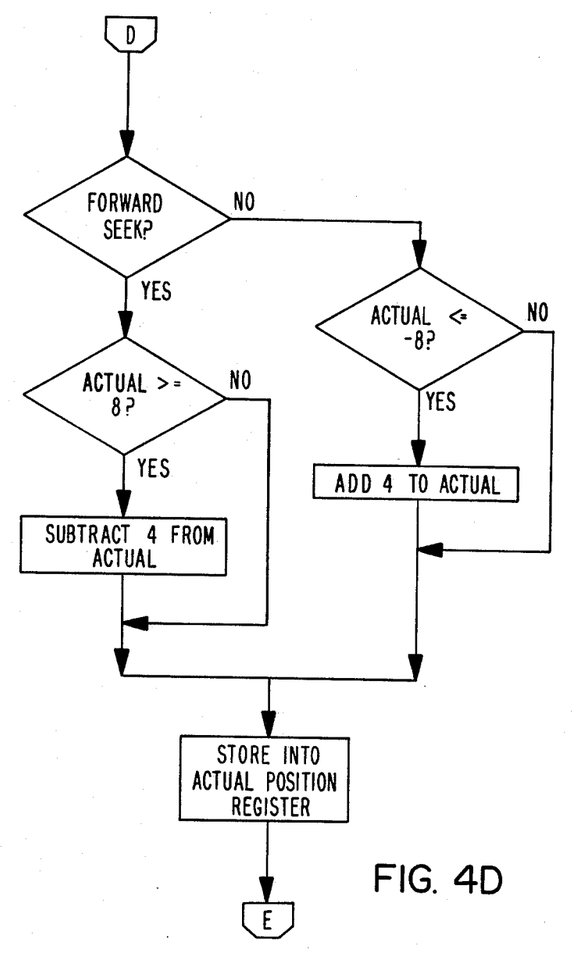
Figure 4E:
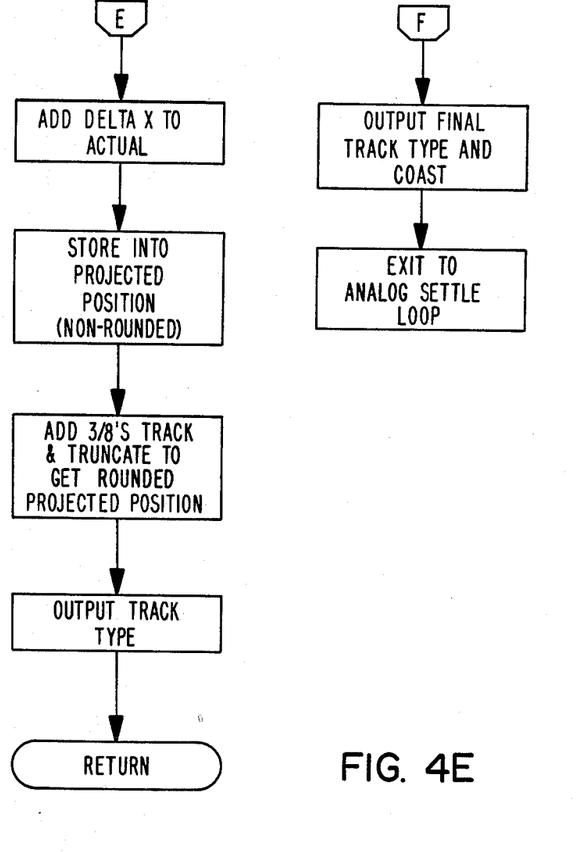

The system next determines whether and in which direction drive is to be applied to move the transducer assembly during the next one sector duration drive period. If the number of remaining tracks to be crossed during the seek is greater than 255, the maximum velocity is loaded (FIG. 4C) as the desired velocity. If the number of tracks to go is 1.25 or less, the final track type (FIG. 4E) is placed on the track type output, the settling sequence is invoked, and control is turned over to the track follow system to center the transducer over the track centerline. If the number of tracks remaining neither exceeds 255 nor is 1.25 less, a table value for the desired transducer assembly velocity for the current "tracks to go" position is obtained (FIG. 4C). If the velocity (delta X) is greater than the desired velocity, opposite direction drive or a decelerating force is applied. If the velocity is equal to or within ⅛ track per second less than the desired velocity, the transducer assembly is allowed to coast for one sector time, and if the velocity is more than one-eighth track per sector slower than the desired velocity, a same direction or accelerating drive is applied.

By establishing a dead band in the region between the desired velocity as an eighth track per sector less, it is possible to allow the transducer assembly to coast a large portion of the time during deceleration. Although ⅛ track per sector appears small, it is about three times the acceleration or deceleration that is effected by a one sector pulse. This reduces the need to pulse the motor in alternate directions on a frequent basis in maintaining the desired velocity profile.

The track types in the present embodiment are four in number, and the track position of the transducer assembly is identified by 5 bits. The least significant three bits indicate the deviation from the track type in eighths of a track pitch. The next two more significant bits indicate the track type. The last three or most significant bit positions of the 8 bit byte contain the carry from the track type. In processing from one four track group to another the number in the three most significant bit positions is either incremented or decremented. In a forward seek condition (FIG. 4D) if a value of 8 or more appears in the overflow from the track type count, a count of 4 is subtracted. Similarly, if a count of −8 or less appears in the overflow from the track type count, a value of 4 is added. This prevents the five bit portion of the register that identifies track position from becoming inaccurate as the transducer moves from one track group to another.

Finally, (FIG. 4E) delta X or sector time travel is added to the actual value and stored in the projected position register. The projected position is rounded off by adding ⅜ track and truncating to the track type value preparatory to receipt of the next sector sense signal whereupon the sequence beginning at FIG. 4A is repeated. This sequence occurs more than 3,000 times per second as the successive sectors appear.

Figure 5:
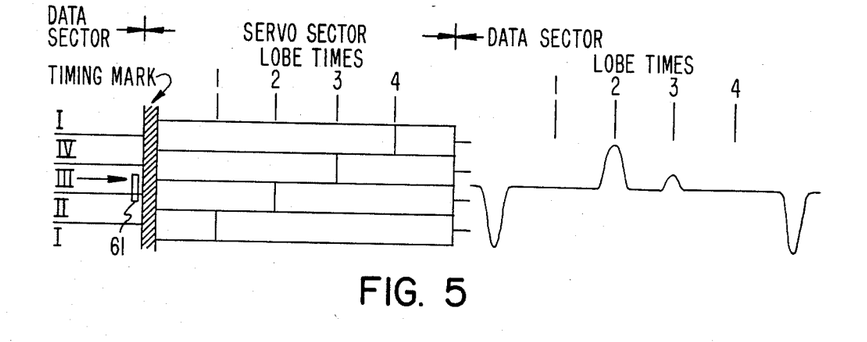
FIG. 5 shows a sector servo technique for identifying one of four adjacent tracks while generating a position error signal representative of the deviation from the track centerline.

FIG. 5 shows the sector servo format that identifies one of four track types and at the same time yields an analog position error signal indicative of the displacement of the transducer from the centerline of the identified data track type. As shown the data tracks are of types I, II, III and IV with the centerline of the data track defined by the interface between two servo tracks. When the transducer gap 61 moves in the direction of the arrow, the timing mark indicates the presence of a sector and is followed by the servo information. Transducer gap 61 is on a track type III, but is displaced from the centerline toward the adjoining type II track. During passage over the servo sector the transducer will read the analog signals at lobe times 2 and 3 as shown in the curve at the right side of FIG. 5. Equal amplitude pulses at lobe times 2 and 3 would indicate the transducer to be positioned on the centerline of a type III track. The analog difference in lobe amplitude is the position error signal indicative of the amount and direction of deviation from the data track centerline. A signal at each of lobe times 1 and 4 indicates a type I track, a signals at lobe times 1 and 2 indicates a type II track and signals at lobe times 3 and 4 indicates a type IV track. A single large amplitude lobe time signal is indicative of a transducer position midway between data track cennterlines.

We claim:

1. In a data storage device wherein information is retained on tracks formed of sectors containing servo data that defines sequences of track types that form a capture area and are accessed by a transducer assembly driven by an electromagnetic actuator, position control means for moving said transducer assembly from one track location to another track location during a seek operation comprising:
a first continuous sequence of selected velocity values adjacent to, but continuously less than a second sequence of the highest velocity values with respect to which maximum deceleration will permit the selected terminal track position to be approached without overshooting;
drive means for applying forward direction drive, reverse direction drive or no drive to said transducer assembly;
acceleration means for applying said drive forward direction drive until a velocity is achieved approaching the value of said first sequence of velocity values; and
deceleration control means for effecting deceleration by using said drive means to induce said transducer assembly to follow said first sequence of velocity values without exceeding said second sequence of velocity values;
said deceleration control means including a continuous range of velocity values adjacent to and including said first sequence of velocity values, but less than said second sequence of velocity values, during which said drive means applies no drive to said transducer assembly whereby a dead band occurs wherein said transducer assembly is allowed to coast.

2. The data storage device position control means of claim 1 wherein said dead band of velocity values has as the upper limit of velocity values the said first continuous sequence of velocity values.

3. The data storage device position control means of claim 2 wherein transducer assembly velocity is sampled during each sector time and said drive means applies forward direction drive for one sector time in response to each sampled velocity found to be less than said dead band velocity values and applies a reverse direction drive to said transducer assembly for one sector time in response to each sampled velocity found to be in excess of said dead band velocity values.

4. The data storage device position control means of claim 1 wherein said drive means supplies forward direction drive to achieve maximum acceleration until reaching a velocity equivalent to said first sequence of velocity values.

5. In a data storage device wherein information is retained on tracks formed of sectors containing servo data that defines sequences of track types that form a capture area and are accessed by a transducer assembly driven by an electromagnetic actuator, position control means for moving said transducer assembly from one track location to another track location during a seek operation comprising:
drive means for applying forward direction drive, reverse direction drive or no drive to said transducer assembly;
velocity control means for applying maximum forward direction drive during the initial portion of a seek operation until track and velocity values are attained closely approaching, but continuously less than a second sequence of values from which maximum reverse direction drive is required to stop said transducer assembly at the desired destination track without overshoot; and
a band of velocity values adjacent to, but lower in magnitude than said second sequence of values;
wherein said velocity control means, following said initial portion of a seek operation samples velocity during each sector time and applies forward drive for one sector time in response to each sampled velocity less than said band of velocity values, applies reverse direction drive for one sector time in response to each sampled velocity greater than said band of velocity values and applies no drive when the sampled velocity is within said band of velocity values.

* * * * *